3,228,831
COMPOSITIONS AND METHOD FOR TREATING SYMPTOMS OF INFLAMMATION, PAIN AND FEVER
John Stuart Nicholson and Stewart Sanders Adams, Nottingham, England, assignors to Boots Pure Drug Company Limited, Nottingham, England, a British company
No Drawing. Filed Jan. 22, 1962, Ser. No. 167,941
Claims priority, application Great Britain, Feb. 2, 1961, 3,999/61
12 Claims. (Cl. 167—53)

This invention relates to phenylalkane derivatives. More particularly it relates to novel pharmaceutical and veterinary compositions which comprise as the active ingredient one or more members of a specified group of derivatives of toluene. The invention also relates to the provision of novel members of this specified group of compounds. In another aspect, the invention relates to the treatment of diseases in animals.

It is an object of the invention to provide therapeutic compositions for the relief of pain, fever and inflammation in animals which do not suffer from the disadvantages of similar therapeutic compositions based on aspirin, phenylbutazone or adrenocorticosteroids.

We have now discovered that compounds of the general Formula I

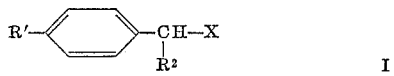

wherein R' represents ethyl, propyl, butyl (except n-butyl), alkylene ($C_2$–$C_4$), pentyl (except n-pentyl), alkoxy ($C_2$–$C_3$), allyloxy, phenoxy, phenylthio or cycloalkyl ($C_5$–$C_7$) optionally substituted by alkyl ($C_1$–$C_2$) in the 1-position, $R^2$ represents hydrogen or methyl and X represents the radical $COOR^3$ wherein $R^3$ represents hydrogen or alkyl ($C_1$–$C_8$) optionally substituted, COOM wherein M represents the ammonium ion or a single equivalent of a non-toxic metallic cation, COOH.B wherein B represents a non-toxic organic base, CONH, CHO, $CH_2NH_2$ or the group $CH_2OR^4$ where $R^4$ represents hydrogen or lower alkanoyl ($C_1$–$C_3$) have valuable anti-inflammatory, analgesic and antipyretic properties.

Furthermore in general the compounds exhibit low toxicity and low irritancy to the gastric mucosa, they do not have other undesirable pharmacological activities which might give rise to unwanted side effects and they are stable in the presence of water.

According to the present invention there are provided therapeutic compositions comprising as active ingredient one or more compounds of the general formula I in association with a pharmaceutically acceptable diluent or carrier.

The following compounds are typical of the active compounds of the general Formula I, but do not limit the invention in any way:

4-n-propylphenylacetic acid
4-ethoxyphenylacetic acid
4-n-isopropylphenylacetic acid
4-propoxyphenylacetic acid
4-isopropoxyphenylacetic acid
4-s-butylphenylacetic acid
4-allyloxyphenylacetic acid
4-t-butylphenylacetic acid
4-cyclopentylphenylacetic acid
4-isobutylphenylacetic acid
4-cycloheptylphenylacetic acid
4-cyclohexylphenylacetic acid
4-(1-ethylpropyl)phenylacetic acid
4-phenoxyphenylacetic acid
4-(1,2-dimethylpropyl)phenylacetic acid
4-phenylthiophenylacetic acid
α-(4-cyclohexylphenyl)propionic acid
2-(4-isobutylphenyl)ethanol
2-(4-cyclohexylphenyl)ethanol
4-vinylphenylacetic acid
2-(4-isopentylphenyl)propanol
4-(1-methylcyclohexyl)phenylacetaldehyde
Ammonium 4-t-butylphenylacetate
4-t-butylphenylacetamide
2-(4-cyclohexylphenyl)propanol
4-isobutylphenylacetaldehyde
4-(2,2-dimethylpropyl)phenylacetic acid
Octyl 4-t-butylphenylacetate
4-(1-methylcyclohexyl)phenylacetic acid
Octyl α-(4-cyclohexylphenyl)propionate
4-(1-ethylcyclohexyl)phenylacetic acid
Ethyl 4-t-butylphenylacetate
4-(2-methylbutyl)phenylacetic acid
α-(4-isobutylphenyl)propionaldehyde
Sodium α-(4-cyclohexylphenyl)propionate
α-(4-cyclohexylphenyl)propionaldehyde
Methyl 4-t-butylphenylacetate
Sodium 4-t-butylphenylacetate
n-Propyl α-(4-isopentylphenyl)propionate
Butyl 4-t-butylphenylacetate
Isopropyl 4-t-butylphenylacetate
α-(4-isopentylphenyl)propionaldehyde
n-Propyl 4-t-butylphenylacetate
2-(4-t-butylphenyl)ethanol
2-(4-butylphenyl)ethyl propionate
2-(4-isobutylphenyl)propanol
α-(4-isobutylphenyl)propionic acid
4-t-pentylphenylacetic acid
2,4'-(1-methylcyclohexyl)phenyl ethanol
2-(4-isopentylphenyl)ethanol
Ethyl-4-isobutylphenylacetate
Benzylamine 4-t-butylphenylacetate
α-(4-t-butylphenyl)propionic acid
4-isopentylphenylacetaldehyde
α-(4-isopentylphenyl)propionic acid
2-4'-t-butylphenylethylamine
Ethyl α-(4-isobutylphenyl)propionate
n-Propyl 4-isopentylphenylacetate
α-(4-s-butylphenyl)propionic acid
α-4'-(1-ethylpropyl)phenylpropionic acid
α-4'-(2-methylbutyl)phenylpropionic acid
α-4'-(2,2-dimethylpropyl)phenylpropionic acid
4-t-butylphenylacetaldehyde
α-4'-(1-ethylcyclohexyl)phenylpropionic acid
α-(4-ethylphenyl)propionic acid.

According to the present invention there is also provided a method of treating inflammation, pain and fever in animals by administering a composition, comprising as active ingredient, one or more of the compounds of general Formula I.

We have discovered that the compounds which are the active components of the compositions of the present invention are superior to acetylsalicylic acid in that they exhibit one or more of the following advantages:

(a) They are less toxic;
(b) They have a higher therapeutic ratio;
(c) They are more stable in the presence of water or water vapour;
(d) They are more soluble in water.

The alkali metal and alkaline earth metal salts of the acids are particularly soluble in water and they are valuable for the preparation of oral compositions.

The active compounds of the present invention may be prepared by methods which are well known for the preparation of phenylacetic acids, phenylpropionic acids and derivatives thereof. Where these processes produce novel compounds, such novel compounds and processes for the preparation thereof are also part of the present invention.

In general the acids, salts and alcohols are relatively the most active compounds followed by the esters and aldehydes. The invention therefore, comprises new compounds falling within the general Formula II:

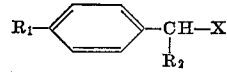

wherein $R_1$ is butyl (except n-butyl), pentyl (except n-pentyl), cyclohexyl (optionally substituted by alkyl ($C_1$–$C_2$) in the 1-position) or cycloheptyl; $R_2$ is hydrogen or methyl; X is COOH, $COOR_3$ ($R_3$=$C_1$–$C_8$), CHO, $CH_2OH$ and the inorganic and organic salts of the acids, provided $R_1$ is not t-butyl or unsubstituted cyclohexyl when $R_2$ is hydrogen and X is COOH or $CH_2OH$ and provided $R_3$ is not ethyl when $R_2$ is hydrogen and $R_1$ is s-butyl, t-butyl or t-pentyl.

A list of methods suitable for preparing these compounds is given below. In these representations $R_1$ and $R_2$ are as hereinbefore defined for general Formulae I and II and Ph represents phenyl or phenylene.

ACIDS (1)

R₁Ph $\xrightarrow{HCl/H.CHO}{ZnCl_2}$ R₁Ph.CH₂.Cl ⟶ R₁Ph.CH₂.Mg.Cl. $\xrightarrow{CO_2}$ R₁Ph.CH₂COOH (2)

R₁Ph $\xrightarrow{HCl/H.CHO}{ZnCl_2}$ R₁Ph.CH₂.Cl ⟶ R₁Ph.CH₂CN $\xrightarrow{hydrolyse}$ R₁Ph.CH₂COOH (3)

R₁Ph $\xrightarrow{HCl/H.CHO}{ZnCl_2}$ R₁Ph.CH₂.Cl ⟶ R₁Ph.CH₂CN $\xrightarrow{NaNH_2}$ R₁Ph.CH.CN $\xrightarrow{MeI}$ R₁Ph.CH.CN $\xrightarrow{hydrolyse}$ R₁Ph.CH.COOH
    |                          |                              |
    Na                        CH₃                            CH₃

(4)

R₁Ph $\xrightarrow{CH_3COCl}{AlCl_3}$ R₁Ph.CO.CH₃ $\xrightarrow{Willgerodt\ and\ hydrolyse}$ R₁Ph.CH₂.COOH (5)

R₁Ph.CH₂.COOEt $\xrightarrow{Et_2CH_3}{NaOEt}$ R₁Ph.CH(COOEt)₂ $\xrightarrow{MeI}{NaOEt}$ R₁Ph.CMe(COOEt)₂ $\xrightarrow{hydrolyse}$ R₁Ph.CMe(COOH)₂ $\xrightarrow{decarboxylate}$ R₁Ph.CH.COOH
                                                |
                                               CH₃

(6)

R₁Ph.CH.COOR₃ $\xrightarrow{hydrolyse}$ R₁Ph.CH.COOH
    |                                      |
    R₂                                     R₂

(R³ is alkyl, aryl, or aralkyl)

(7)

R₁Ph $\xrightarrow{COCl.COOR^3}$ R₁Ph.CO.COOR³ $\xrightarrow{MeMgBr}$

R₁Ph.C(OH).COOR³ $\xrightarrow{hydrolyse}$
    |
    CH₃

R₁Ph.C.(OH).COOH $\xrightarrow{P/I}$ R₁Ph.CH.COOH
    |                                    |
    CH₃                                 CH₃

(R³ is alkyl)

(8)

R₁Ph.Br ⟶ R₁Ph.MgBr $\xrightarrow{CH_3.CO.COOEt}$

R₁Ph.C(OH).COOEt $\xrightarrow{hydrolyse}$
    |
    CH₃

R₁Ph.C(OH).COOH $\xrightarrow{P/I}$ R₁Ph.CH.COOH
    |                                    |
    CH₃                                 CH₃

(9)

R₁Ph.COCH₃ + HCN ⟶

R₁Ph.C(OH).CH₃ $\xrightarrow{HI/P}$ R₁Ph.CH.COOH
    |                                    |
    CN                                  CH₃

(10)

R₁Ph + CH₃.CH.CN $\xrightarrow{AlCl_3}$
              |
              O.SO₂C₆H₅

R₁Ph.CH.CN $\xrightarrow{hydrolyse}$ R₁Ph.CH.COOH
    |                                    |
    CH₃                                 CH₃

(11) Alcohols and aldehydes may be oxidised to the corresponding acids.

ESTERS (1)

R₁Ph.CH.COOH + R³OH $\xrightarrow{H_2SO_4}$ R₁Ph.CH.COOR³
    |                                          |
    R₂                                         R₂

(2)

R₁Ph.CH.COOH ⟶ R₁Ph.CH.COCl $\xrightarrow{R^3OH}$ R₁Ph.CH.COOR³
    |                |                                |
    R₂               R₂                               R₂

(3)

R₁Ph. ⟶ R₁Ph.Cl. ⟶

R₁Ph.Mg.Cl $\xrightarrow{Br.CH(R_2).COOR^3}$ R₁Ph.CH.COOR³
                                                 |
                                                 R₂

(4)

R₁Ph $\xrightarrow{COCl.COOR^3}$ R₁Ph.CO.COOR³ $\xrightarrow{H}$ R₁Ph.CH₂.COOR³

(5)

R₁Ph.CH.COOR³ $\xrightarrow{NaH}$

R₁Ph.CHNa.COOR³ $\xrightarrow{MeI}$ R₁Ph.CH.COOR³
                                          |
                                         CH₃

(6)

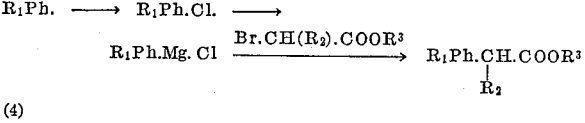

(7)

R₁Ph.CH.COOH + dialkylaminoalkyl halide ⟶
    |
    R₂
                     dialkylaminoalkyl ester hydrochloride ($R^3$ is alkyl or where possible substituted alkyl e.g. diethylaminoethyl).

ALCOHOLS (1)

R₁Ph $\xrightarrow{Cl}$ RPhCl ⟶

R₁Ph.Mg.Cl $\xrightarrow{Ethylene\ oxide}$ R₁Ph.CH₂CH₂OH (2)

R₁Ph.CH.COOR₃ $\xrightarrow{hydrogenation}$
    |
    R₂

R₁Ph.CH.CH₂OH ($R_3$ is H or alkyl)
    |
    R₂

ALDEHYDES (1)

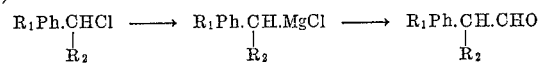

The conversion of the Grignard compound to the aldehyde may be carried out by any of the known methods using e.g. $HC(OEt)_3$, $Ph.N=CH.OEt$, $Ph.NMe.OCH$.

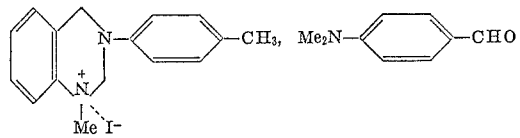

(2)

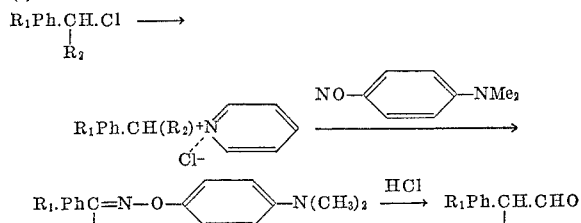

(3) $R_1Ph.CH.COCl \longrightarrow R_1Ph.CH.CHO$
         $|$                       $|$
         $R_2$                     $R_2$ This conversion may be carried out using the known methods, e.g. using

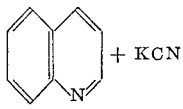

followed by HCl, the Rosenmund reaction, hydrogenation in the presence of lithium tributoxyalumino hydride at −70° C, or the MacFadyen, Stephens reaction.

(4)

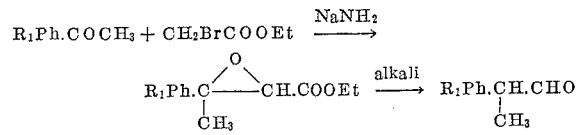

(5) Other methods of making aldehydes have been described by:

(a) Sonn and Müller; Ber., 1919, 52, 1927.
(b) Fieser, Joshel and Seligman; J.A.C.S., 1939, 61, 1774.
(c) Davies, Hodgson; J., 1943, 282.
(d) Lecomte, Dufour; Compt. rend., 1952, 234, 1887.
(e) Leanze et al.; J.A.C.S., 1954, 76, 1691.
(f) Kornthum et al.; J.A.C.S., 1959, 81, 4113.
(g) Wolfram, Karabinos; J.A.C.S., 1946, 68, 1455.
(h) Stephen method; J., 1925, 127, 1874.
(i) Brown et al.; Tetrahedron letters, 1959, 3, 9.
(j) Brown, Tsukamoto; J.A.C.S., 1959, 81, 502.
(k) Weygard; Angew Chem., 1953, 65, 525.
(l) Reid, Konigstein; Angew Chem., 1958, 70, 165.
(m) Brown, Tsukamoto; J.A.C.S., 1961, 53, 2016.
(n) Levine; J.A.C.S., 1958, 80, 6150.

The salts of the acids can be made by reacting the acids with organic or inorganic bases.

The pharmaceutically acceptable diluents or carriers which are admixed with the active compound to form the compositions of this invention are well-known in the art. The actual excipients which are used depend inter alia on the method of administering the compositions. The compositions of this invention may be adapted for oral, topical or parenteral use but the preferred method of administration is per os. In this case the oral compositions may take the form of capsules, tablets, lozenges or effervescent, granules, or liquid preparations such as mixtures, elixirs, syrups or suspensions, all containing one or more compounds of the aforementioned general formula; such preparations may be made by methods well-known in the art.

The diluents which may be used in the preparation of such compositions include those solid and liquid diluents which are compatible with the active ingredients together with colouring matter and flavouring if desired. We have found that a tablet containing the active ingredient in the form of a salt in association with maize starch as a diluent is a particularly valuable and convenient composition. Such tablets disintegrate rapidly in the stomach and generally do not set up gastric irritation.

The compositions of the invention in the form of effervescent granules may comprise a compound of the above general formula in association with a combination of effervescing agents well-known in the art. Such an effervescent combination may include for example sodium bicarbonate in association with a free acid or acid salt such as tartaric acid or sodium acid tartrate.

The liquid compositions of the invention adapted for oral use may be in the form of solutions or suspensions. Such compositions in the form of solutions may be aqueous solutions of a soluble compound of the above general formula in association with, for example, sucrose to provide a syrup. The composition in the form of suspensions may comprise an insoluble compound of the present invention in association with water together with a suspending agent, flavouring agents, colouring matter, etc.

The compositions of the invention which are adapted for topical use include ointments, creams and lotions containing compounds of the above general formula or their derivatives. Suitable ointments and creams may be water miscible or water immiscible in character and include emulsions prepared from emulsifying waxes and oils and also those prepared from water miscible polyethylene glycols. The lotions according to the invention may comprise a solution of the active ingredients of the above general formula in a suitable liquid solvent diluent which is preferably a lower aliphatic alcohol which may contain a small proportion of water.

The active ingredients of the present invention may also be incorporated into the novel compositions with other known therapeutically active compounds.

The screening test which was used to detect anti-inflammatory activity was that described by Adams and Cobb, Nature, 181, 773, 1958.

Analgesic and antipyretic properties of the compounds were also assessed as were their toxicities on several types of animals, namely mice, rats, guinea pigs, cats and dogs. As is to be expected, the relative activities varied widely.

The evidence is that like aspirin the compounds of the present invention are useful in the treatment of (a) painful inflammation of the joints and periarticular tissues as occurs in rheumatoid arthritis, Still's disease and osteoarthritis; (b) various types of non-specific inflammatory or rheumatic conditions affecting the fibromuscular tissues and connective tissue; (c) rheumatic fever and its sequelae.

The following non-limitative examples illustrate the invention:

Example 1

4-isobutylacetophenone (49.4 g.), sulphur (13.6 g.) and morpholine (38 ml.) were refluxed for 16 hours; concentrated hydrochloric acid (344 ml.) and glacial acetic acid (206 ml.) were added and the mixture was refluxed for a further 7 hours. The mixture was cooled, diluted with water and the oil which separated was isolated with ether. The ethereal solution was extracted into aqueous sodium carbonate from which the crude acid was precipitated by addition of hydrochloric acid. The crude acid was again isolated with ether, the solution washed with water and evaporated to dryness to give a crystalline residue. The residue was crystallised from light petroleum (B.P. 40–60° C.) to give 4-isobutylphenylacetic acid M.P. 85.5–87.5° C. Found: C, 75.1; H, 8.5. $C_{12}H_{16}O_2$ requires C, 75.0; H, 8.3%.

The following compounds were made by the same method:

4-cycloheptyl phenylacetic acid M.P. 90.5–92.5° C. (Found: C, 77.3; H, 8.7. $C_{15}H_{20}O_2$ requires C, 77.6; H, 8.6%.)

4-(1-ethylpropyl)phenylacetic acid B.P. 153–154° C./2.5 mm. (Found: C, 75.4; H, 8.6. $C_{13}H_{18}O_2$ requires C, 75.8; H, 8.7%.)

4-(1,2-dimethylpropyl)phenylacetic acid B.P. 156–7° C./2.5 mm. (Found: C, 75.5; H, 8.6. $C_{13}H_{18}O_2$ requires C, 75.8; H, 8.7%.)

4-(2,2-dimethylpropyl)phenylacetic acid M.P. 110.5–111° C. (Found: C, 75.6; H, 8.5. $C_{13}H_{18}O_2$ requires C, 75.8; H, 8.7%.)

4-(2-methylbutyl)phenylacetic acid M.P. 38–40° C. (Found: C, 75.5; H, 8.7. $C_{13}H_{18}O_2$ requires C, 75.8; H, 8.7%.)

4-(1-methylcyclohexyl)phenylacetic acid B.P. 194–6° C./3 mm. (Found: C, 77.8; H, 8.4. $C_{15}H_{22}O_2$ requires C, 77.6; H, 8.6%.)

4-(1-ethylcyclohexyl)phenylacetic acid, B.P. 188°/0.7 mm. (Found: C, 77.5; H, 8.2. $C_{16}H_{22}O_2$ requires C, 78.0; H, 8.9%.)

4-isopentylphenylacetic acid, M.P. 62.5–63.5° C. (Found: C, 76.6; H, 8.6. $C_{13}H_{18}O_2$ requires C, 75.8; H, 8.7%.)

4-(1-methylbutyl)phenylacetic acid, B.P. 114°/1.5 mm. (Found: C, 75.4; H, 8.6. $C_{13}H_{18}O_2$ requires C, 75.8; H, 8.7%.)

Example 2

4-s-butylacetophenone (40 g.) sulphur (11 g.) and morpholine (30 ml.) were refluxed for 16 hours, cooled, acetic acid (170 ml.) and concentrated hydrochloric acid (280 ml.) were added and the mixture was refluxed for a further 7 hours. The mixture was concentrated in vacuo to remove acetic acid and the concentrate was diluted with water. The oil which separated was isolated with ether, the ethereal solution was extracted with aqueous sodium carbonate and this extract was acidified with hydrochloric acid. The oil was isolated with ether, evaporated to dryness and the residue was esterified by refluxing with ethanol (100 ml.) and concentrated sulphuric acid (3 ml.) for 5 hours. The excess alcohol was distilled off, the residue was diluted with water, and the oil which separated was isolated with ether. The ethereal solution was washed with sodium carbonate solution; then with water and was dried. The ether was evaporated off and the oil was distilled to give ethyl 4-s-butylphenylacetate B.P. 114–116° C./1.5 mm. (Found: C, 76.4; H, 9.0. $C_{14}H_{20}O_2$ requires C, 76.4; H, 9.1%).

Ethyl 4-s-butylphenylacetate (7.8 g.) was refluxed for 1 hour with sodium hydroxide solution (5 N 10 ml.) and methanol (10 ml.), acidified with hydrochloric acid and the oil which separated was isolated with ether. The ethereal solution was washed with water, dried and distilled to give 4-s-butylphenylacetic acid B.P. 134° C./0.5 mm. (Found: C, 74.9; H, 8.5. $C_{12}H_{16}O_2$ requires C, 75.0; H, 8.3%.)

In a similar manner the following compound was prepared from the appropriate ester.

4-t-pentylphenylacetic acid B.P. 156° C./2.5 mm. (Found: C, 75.6; H, 8.6. $C_{13}H_{18}O_2$ requires C, 75.8; H, 8.7%.)

Example 3

4-t-butylphenylacetyl chloride (10.5 g.) was added dropwise to n-butanol (12 ml.) and the mixture was heated on the steam bath for 30 minutes. The product was distilled to give as a colourless oil butyl 4-t-butylphenylacetate B.P. 126° C./1 mm. (Found: C, 77.7; H, 9.6. $C_{16}H_{24}O_2$ requires C, 77.4; H, 9.7%.)

Similarly there was prepared:

Octyl 4-t-butylphenylacetate B.P. 162° C./1 mm. (Found C, 78.9; H, 10.6. $C_{20}H_{32}O_2$ requires C, 78.9; H, 10.5%.)

Methyl 4-t-butylphenylacetate B.P. 106° C./2.5 mm. (Found: C, 76.1; H, 8.8. $C_{13}H_{18}O_2$ requires C, 75.8; H, 8.7%.)

Isopropyl 4-t-butylphenylacetate B.P. 114° C./1.5 mm. (Found: C, 76.6; H, 9.2. $C_{15}H_{22}O_2$ requires C, 77.0; H, 9.4%.)

n-Propyl 4-t-butylphenylacetate B.P. 112° C./1 mm. (Found: C, 76.9; H, 9.5. $C_{15}H_{22}O_2$ requires C, 77.0; H, 9.4%.)

Example 4

4-t-butylphenylacetamide (12.3 g.) was placed in a Soxhlet extractor and extracted with boiling ether into a solution of lithium aluminium hydride (3.0 g.) in dry ether (500 ml.). After refluxing for 6 hours the mixture was decomposed with water and the ethereal filtrate from aluminium hydroxide was extracted with very dilute hydrochloric acid. The aqueous solution was basified with sodium hydroxide solution (5 N) and the oil isolated in ether and distilled to give 2-4′-t-butylphenylethylamine B.P. 92° C./2 mm. as a colourless oil. (Found: C, 81.0; H, 11.0; N, 7.6. $C_{12}H_{19}N$ requires C, 81.3; H, 10.7; N, 7.9%.)

Example 5

Sodium ethoxide from sodium (3.67 g.) in absolute alcohol (64 ml.) was added over 20 minutes with stirring to a mixture of ethyl 4-t-butylphenylacetate (28.14 g.) and ethyl carbonate (102 ml.) at 100° C. The reaction flask was fitted with a Fenske column through which alcohol and then ethyl carbonate distilled. After 1 hour when the still head reached 124° C. heating was discontinued. Glacial acetic acid (12 ml.) and water (50 ml.) was added to the stirred ice cooled mixture and the ester isolated in ether, washed with sodium carbonate solution, water and distilled to give ethyl 4-t-butylphenylmalonate B.P. 144° C./1.5 mm. (Found: C, 70.4; H, 8.4. $C_{17}H_{24}O_4$ requires C, 69.9; H, 8.2%.)

Ethyl 4-t-butylphenylmalonate (27.53 g.) in absolute alcohol (25 ml.) was added with stirring to a solution of sodium ethoxide from sodium (2.17 g.) in absolute alcohol (75 ml.). Ethyl iodide (15 ml.) was added and the mixture refluxed for 2½ hours, the alcohol distilled and the residue diluted with water, extracted with ether, washed with sodium bisulphite, water, and evaporated to dryness.

The residual oil was stirred and refluxed with sodium hydroxide (75 ml. of 5 N) water (45 ml.) and SVM (120 ml.). Within a few minutes a sodium salt separated and after 1 hour the solid was collected, washed with ethanol, dissolved in hot water and acidified with dilute hydrochloric acid to give the c-methyl malonic acid which was collected and dried in vacuo M.P. 177–180° (dec.).

The malonic acid (9 g.) was heated to 210–220° C. in an oil bath for 20 minutes until decarboxylation had ceased. The propionic acid was cooled and recrystallised from light petroleum (B.P. 60–80° C.).

Two further recrystallisations from the same solvent gave colourless prisms of 2-4′-t-butylphenylpropionic acid M.P. 101–103.5° C. (Found: C, 75.4; H, 8.7. $C_{13}H_{18}O_2$ requires C, 75.8; H, 8.7%.)

In the same manner the following were prepared:

2,4′-cyclohexylphenylpropionic acid M.P. 110.5–112.5° C. (Found C, 77.8; H, 8.1. $C_{15}H_{20}O_2$ requires C, 77.6; H, 8.6%.)

2 - 4′ - isobutylphenylpropionic acid M.P. 75–77.5° C. (Found: C, 75.3; H, 8.6. $C_{13}H_{18}O_2$ requires C, 75.8; H, 8.7%.)

Example 6 t-Butylbenzyl chloride (20 g.) was added slowly to magnesium (2.65 g.) and ether (45 ml.), toluene (25 ml.) was added and the ether distilled. Ethyl orthoformate (12 g.) was added dropwise with stirring at 100° C. and the temperature maintained for 30 minutes. The mixture was cooled, decomposed with dilute hydrochloric acid and the toluene layer separated, washed with water, evaporated and the residue refluxed with 5 N sulphuric acid (75 ml.) for 1 hour. The solution was cooled, extracted with light petroleum (62–68° C.) and the extract was shaken with aqueous sodium bisulphite solution. The solid complex was collected, washed with ether, decomposed by warming with dilute sulphuric acid and the aldehyde isolated with ether and distilled to give 4-t-butylphenylacetaldehyde B.P. 130° C./1.5 mm. (Found C, 82.3; H, 9.4. $C_{12}H_{16}O$ requires C, 81.8; H, 9.1%.)

Example 7

Propionyl chloride (4.9 g.) was added to a mixture of 2-4'-t-butylphenylethanol (6 g.) and dry pyridine (6 ml.) and the mixture was heated under anhydrous conditions for 30 minutes on the steam bath. The reaction mixture was poured into water, acidified with 5 N sulphuric acid and the oily product was collected with ether. The ether was distilled to give 2-4'-t-butylphenylethyl propionate as an oil B.P. 131–2° C./1.5 mm. (Found: C, 77.8; H, 9.1. $C_{15}H_{22}O_2$ requires C, 76.9; H, 9.4%.)

Example 8

4-isobutylcyclohexanone (34.28 g.) A.R. zinc filings (16.0 g.) ethyl bromoacetate (26.5 ml.) and dry benzene (120 ml.) were warmed until a vigorous reaction set in which required external cooling. The mixture was then refluxed for 30 minutes, decomposed with ice cold dilute sulphuric acid, the benzene solution separated, washed with water, dried and evaporated. The residue (49 g.) dry pyridine (45 ml.) dry ether (93 ml.) were stirred with ice cooling and thionyl chloride (26 ml.) added dropwise over 30 minutes, the temperature being held below 12° C. After stirring for 2 hours at 0° C., water was cautiously added to the reaction mixture, the ethereal solution was washed with water, dried and ethyl 4-isobutylcyclohex-1-enylacetate was distilled; B.P. 106–109° C./2 mm. (Found: C, 75.0; H, 10.4. $C_{14}H_{24}O_2$ requires C, 75.0; H, 10.7%.)

Ethyl 4-isobutylcyclohex-1-enylacetate (8.0 g.) and sulphur (2.7 g.) were heated at 210° for 5 hours, then at 240° C. for 2 hours. Copper powder (100 mg.) was added and the heating continued for 5 minutes; the mixture was cooled, diluted with ether, filtered and ethyl 4-isobutylphenylacetate was distilled; B.P. 110° C./1 mm. (Found: C, 76.7; H, 9.2. $C_{14}H_{20}O_2$ requires C., 76.4; H, 9.1%.)

Example 9

4-isobutylbenzyl chloride (50 g.), sodium cyanide (16.1 g.), alcohol (100 ml. water (30 ml.) were refluxed and stirred for 5 hours. The alcohol was distilled, the oil isolated in ether, washed with water and distilled. B. P. 113° C./2 mm.

4-isobutylphenylacetonitrile (30 g.), alcohol (100 ml.), 5 N sodium hydroxide (60 ml.) were refluxed for 6 hours and the alcohol removed by distillation. The residue was acidified with dilute hydrochloric acid and the precipitate collected in either, extracted with dilute sodium carbonate solution, and the extracts acidified with dilute hydrochloric acid. The crystalline precipitate of 4-isobutylphenylacetic acid was collected, washed with water dried in vacuo and recrystallised from light petroleum.

Example 10

To an ice cold stirred solution of anhydrous aluminum chloride (40.0 g.) in nitrobenzene (125 ml.) was slowly added ethyl oxalyl chloride (27.4 g.) followed by the dropwise addition of isobutyl benzene (35 g.). After stirring for 5 hours at room temperature the mixture was decomposed wtih cracked ice, ether (200 ml.) added and the organic phase washed with sodium hydrogen carbonate solution, water and distilled; B.P. 155° C./3 mm.

Ethyl 4-isobutylphenylglyoxylate (11.0 g.) was hydrogenated at room temperature and 2 atmospheres of hydrogen in the presence of palladium black (1.0 g.) and glacial acetic acid (80 ml.). When absorption of hydrogen had ceased, perchloric acid (7 g. of 70%) was added and hydrogenation continued until absorption was complete. The filtrate from the catalyst was treated with aqueous sodium hydroxide to neutralise the perchloric acid and acetic was distilled in vacuo below 50° C. The residue was hydrolysed by refluxing and stirring with 2 N sodium hydroxide (50 ml.) for 6 hours, cooled and acidified with dilute hydrochloric acid, the precipitate of 4-isobutylphenylacetic acid collected, washed with water, dried in vacuo and recrystallised from light petroleum; (B.P. 62–68° C.).

Example 11

BENZYLAMINE 4-t-BUTYLPHENYLACTATE 4-t-butylphenylacetic acid (1.35 g.) and benzylamine (0.75 g.) were mixed in ether (30 ml.) and the salt collected and recrystallised from absolute alcohol in colourless plates; M.P. 144–147° C. (Found: N, 4.8. $C_{19}H_{25}NO_2$ requires N, 4.7%.)

Example 12

DIETHYLAMINOETHYL 4-t-BUTYLPHENYLACETATE

N,N-diethylaminoethanol (10.0 g.) in dry ether (50 cc.) was added dropwise to a stirred solution of 4-t-butylphenylacetyl chloride (15.0 g.) in dry ether (100 cc.) at 0–5° C. After stirring for 1 hour at room temperature, water (20 cc.) was added and the ether extracted twice with 2 N hydrochloric acid. The aqueous solutions were combined, basified with 2 N sodium hydroxide and the oil isolated in ether washed with water, dried and distilled B.P. 156–160° C./1.5 mm. 8.5 g., 34%. Re-distilled to give a practically colourless liquid B.P. 153–154° C./1.5 mm. (Found: N, 5.2. $C_{18}H_{29}NO_2$ requires N, 4.8%.)

Example 13

2-4'-ISOBUTYLPHENYLETHANOL

Ethyl 4-isobutylphenylacetate (15 g.) in dry ether (50 ml.) was added dropwise to a stirred solution of lithium aluminium hydride (3 g.) in ether (150 ml.). The mixture was refluxed for 1 hour, decomposed with dilute sulphuric acid; the ether was separated and washed with water, dried and distilled to give 2-4'-isobutylphenylethanol; B.P. 104° C./0.8 mm. (Found: C, 80.3; H, 10.2. $C_{12}H_{18}O$ requires C, 80.9; H, 10.1%.)

Example 14

ETHYL 4-ISOBUTYLPHENYLACETATE 4-isobutylphenylacetic acid (75 g.), absolute alcohol (500 ml.) and concentrated sulphuric acid (15 ml.) were refluxed for 4 hours. Excess alcohol was distilled in vacuo, the residue diluted with water and the ester was isolated in ether, washed with sodium carbonate solution, then water before being dried and distilled; its B.P. was 108–110° C./0.6 mm. (Found: C, 76.7; H, 9.2. $C_{14}H_{20}O_2$ requires C, 76.4; H, 9.1%.)

In the same manner the following compounds were made:

Ethyl 4-cyclohexylphenylacetate; B.P. 140° C./1 mm. (Found: C, 78.5; H, 9.2. $C_{16}H_{22}O_2$ requires C. 78.0; H, 8.9%.)

Ethyl 2-4'-isobutylphenylpropionate; B.P. 107° C./1 mm. (Found: C, 76.8; H, 9.6. $C_{15}H_{22}O_2$ requires C, 77.0; H, 9.4%.)

Example 15

An intimate mixture was prepared of equal parts of 4-isobutylphenylacetic acid and a tablet base comprising starch with the addition of 1% magnesium stearate as a lubricant. The mixture was compressed into tablets containing 2½ grains of 4-isobutylphenylacetic acid.

Similar tablets were also prepared but using as the active ingredient other compounds of the present invention such as 4-isobutylphenylpropionic acid or 4-cyclohexylphenylacetic acid.

Example 16

An intimate mixture was made of 5 parts of 4-isobutylphenylacetic acid and 3 parts of a tablet base comprising starch with the addition of 1% magnesium stearate as a lubricant. The mixture was compressed into tablets containing 5 grains of 4-isobutylphenylacetic acid.

Similar tablets were also prepared but using as the active ingredient other compounds of the invention such as 4-isobutylphenylpropionic acid or 4-cyclohexylphenylacetic acid.

Example 17

A mixture was prepared from the following ingredients:

| | | |
|---|---|---|
| Sodium 4-isobutylphenylacetate | g | 13.7 |
| Concentrated orange peel infusion | ml | 62.5 |
| Chloroform water to | ml | 1,000 |

A dose of the above mixture is contained in 15 ml.

Example 18

A suspension was prepared from the following ingredients:

| | | |
|---|---|---|
| 4-isobutylphenylacetic acid | g | 13.7 |
| Compound tragacanth powder | g | 22.9 |
| Chloroform water to | ml | 1,000 |

A dose of the above suspension is contained in 15 ml.

Example 19

An elixir was prepared from the following ingredients:

| | | |
|---|---|---|
| Sodium 4-cyclohexylphenyl acetate | g | 13.7 |
| Ethanol (90%) | ml | 400 |
| Glycerol | ml | 333 |
| Compound orange spirit | ml | 33 |
| Compound tartrazine solution | ml | 10.4 |
| Water to | ml | 1,000 |
| Dose | ml | 15 |

We claim:

1. A method of alleviating the symptoms of inflammation which comprises administering to an animal suffering such symptoms between 1 and 100 grains daily of a compound of the formula:

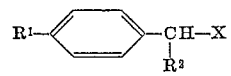

wherein $R^1$ is selected from the group consisting of ethyl, propyl, branched $C_4$ and $C_5$ alkyl, $C_2$ and $C_3$ alkyloxy, allyloxy, phenoxy, phenylthio, $C_5$ to $C_7$ cycloalkyl and $C_5$ to $C_7$ cycloalkyl substituted in the one position by a $C_1$ to $C_2$ akyl, $R^2$ is selected from the group consisting of hydrogen and methyl; X is selected from the group consisting of —COOR$^3$, —COOM, —COOH.B and —CH$_2$.O wherein $R^3$ is selected from the group consisting of hydrogen and $C_1$ to $C_4$ alkyl, M is selected from the group consisting of NH$_4$ and a single equivalent of a non-toxic metallic cation and B is a non-toxic organic base.

2. The method of claim 1 in which the inflammation is inflammation of the connective tissue and the amount of said compound administered to the animal daily is between 5 and 100 grains.

3. The method of claim 2 in which the inflammation is that of rheumatoid arthritis.

4. The method of claim 2 in which the inflammation is that of rheumatic fever.

5. A method of alleviating the symptoms of pain which comprises administering to an animal suffering such symptoms between 1 and 100 grains daily of a compound of the formula:

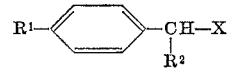

wherein $R^1$ is selected from the group consisting of ethyl, propyl, branched $C_4$ and $C_5$ alkyl, $C_2$ and $C_3$ alkyloxy, allyloxy, phenoxy, phenylthio, $C_5$ to $C_7$ cycloalkyl and $C_5$ to $C_7$ cycloalkyl substituted in the one position by a $C_1$ to $C_2$ alkyl; $R^2$ is selected from the group consisting of hydrogen and methyl; X is selected from the group consisting of —COOR$^3$, —COOM, —COOH.B and —CH$_2$.OH wherein $R^3$ is selected from the group consisting of hydrogen and $C_1$ to $C_4$ alkyl, M is selected from the group consisting of NH$_4$ and a single equivalent of a non-toxic metallic cation and B is a non-toxic organic base.

6. A method of alleviating the symptoms of fever which comprises administering to an animal suffering such symptoms between 1 and 100 grains daily of a compound of the formula:

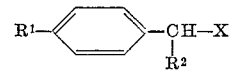

wherein $R^1$ is selected from the group consisting of ethyl, propyl, branched $C_4$ and $C_5$ alkyl, $C_2$ and $C_3$ alkoxy, allyloxy, phenoxy, phenylthio, $C_5$ to $C_7$ cycloalkyl and $C_5$ to $C_7$ cycloalkyl substituted in the one position by a $C_1$ to $C_2$ alkyl; $R^2$ is selected from the group consisting of hydrogen and methyl; X is selected from the group consisting of —COOR$^3$, —COOM, —COOH.B and —CH$_2$.OH wherein $R^3$ is selected from the group consisting of hydrogen and $C_1$ to $C_4$ alkyl, M is selected from the group consisting of NH$_4$ and a single equivalent of a non-toxic metallic cation and B is a non-toxic organic base.

7. A therapeutic composition in dosage form adapted for therapeutic administration comprising per unit as active ingredient 25–500 mg. of a compound of the formula:

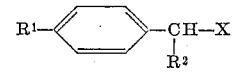

wherein $R^1$ is selected from the group consisting of ethyl, propyl, branched $C_4$ and $C_5$ alkyl, $C_2$ and $C_3$ alkyloxy, allyloxy, phenoxy, phenylthio, $C_5$ to $C_7$ cycloalkyl and $C_5$ to $C_7$ cycloalkyl substituted in the one position by a $C_1$ to $C_2$ alkyl; $R^2$ is selected from the group consisting of hydrogen and methyl; X is selected from the group consisting of —COOR$^3$, —COOM, —COOH.B and —CH$_2$.OH where $R^3$ is selected from the group consisting of hydrogen and $C_1$ to $C_4$ alkyl, M is selected from the group consisting of NH$_4$ and a single equivalent of a non-toxic metallic cation and B is a non-toxic organic base, in association with a pharmaceutically acceptable carrier.

8. The composition according to claim 7 in which the pharmaceutically effective carrier comprises starch and magnesium stearate.

9. A therapeutic composition in dosage unit form comprising per unit 25 to 500 mg. of 4-isobutylphenyl acetic acid and a pharmaceutically acceptable carrier.

10. A therapeutic composition in dosage unit form comprising per unit 25 to 500 mg. of a non-toxic salt of 4-isobutylphenyl acetic acid and a pharmaceutically acceptable carrier.

11. A tablet comprising 2½–5 grains of 4-isobutylphenylacetic acid as the therapeutically effective ingredient associated with a pharmaceutical base comprising starch and magnesium stearate.

12. A tablet comprising 2½–5 grains of sodium 4-isobutylphenylacetate as the therapeutically effective ingredient associated with a pharmaceutical base comprising starch and magnesium stearate.

References Cited by the Examiner

UNITED STATES PATENTS

| | | | |
|---|---|---|---|
| 3,046,305 | 7/1962 | Braunwarth | 260—515 |
| 3,047,462 | 7/1962 | Maillard et al. | 167—65 |
| 3,047,464 | 7/1962 | Schaeppi | 167—65 |
| 3,102,135 | 8/1963 | Petropoulos et al. | 260—515 |

OTHER REFERENCES

Chem. Abst., (1), vol. 54, p. 21486(a) (1960).
Chem. Abst., (2), vol. 53, p. 19305(e) (1959).
Chem. Abst., (3) vol. 54, p. 18499(e) (1960).
Chem. Abst., (4), vol. 54, p. 435(g) (1960).
Chem. Abst., (5), vol. 44, p. 9375(a) (1950).
Chem. Abst., (6), vol. 47, p. 3274(a) (1953).
Chem. Abst., (7), vol. 43, p. 3361(g) (1949).
Chem. Abst., (8), vol. 50, p. 1986(i) (1956).
Chemical Abstracts I, vol. 42, pg. 4557d (1948) (abstract of Carter et al., J. Chem. Soc. Part I, pp. 150–155).
Chemical Abstracts II, vol. 46, pg. 1515c (1952) (abstract of Skinner et al., J. Am. Chem. Soc., vol. 73, pp. 2230–2233 (1951).

FRANK CACCIAPAGLIA, JR., *Primary Examiner.*

MORRIS O. WOLK, *Examiner.*